United States Patent [19]
Heron

[11] 3,721,871
[45] March 20, 1973

[54] HIGH VOLTAGE MONOLITHIC CERAMIC CAPACITOR

[76] Inventor: John B. Heron, 1518 Celia, Wichita Falls, Tex. 76302

[22] Filed: Aug. 12, 1969

[21] Appl. No.: 849,474

[52] U.S. Cl. ............................................. 317/261
[51] Int. Cl. ............................................. H01g 1/00
[58] Field of Search ............... 317/261, 242, 260, 258

[56] References Cited

UNITED STATES PATENTS 2,949,570   8/1960   Rayburn ........................... 317/260
3,235,939   2/1966   Rodriguez ..................... 317/261 UX
3,496,434   2/1970   Prokopowicz .................... 317/258

FOREIGN PATENTS OR APPLICATIONS 995,507   12/1963   Great Britain .................... 317/261

Primary Examiner—E. A. Goldberg
Attorney—Connolly and Hutz, Vincent H. Sweeney, James Paul O'Sullivan and David R. Thornton

[57] ABSTRACT

The possibility of shorting through potential failure paths at high voltage in a monolithic ceramic capacitor is reduced by inclusion of floating electrodes alternately spaced between sets of capacitor plates which are deposited on the same surface of ceramic layers in a ceramic stack.

2 Claims, 3 Drawing Figures

HIGH VOLTAGE MONOLITHIC CERAMIC CAPACITOR

BACKGROUND OF THE INVENTION

This invention relates to a high voltage monolithic ceramic capacitor, and its method of manufacture, and particularly to such a capacitor whereby possible failure paths inherent in prior art capacitors are eliminated solely by the geometrical arrangement of the electrodes.

One type of prior art capacitor of a satisfactory small size is a capacitor having its dielectric layers constructed in parallel arrangement. The geometrical arrangement of electrodes in prior art capacitors form inherent failure paths, thereby limiting the maximum voltage rating of the capacitor.

An object of this invention is to provide a high voltage monolithic ceramic capacitor without inherent, potential failure paths.

A further object is to provide a high voltage monolithic ceramic capacitor whose manufacturing process is simplified by having both capacitor plates deposited on the same surface.

SUMMARY OF THE INVENTION

The high voltage monolithic ceramic capacitor of this invention comprises layers of ceramic dielectric overlaid with a set of capacitor plates and alternately spaced with other layers of ceramic dielectric which are overlaid with floating conductive electrodes forming a common capacitive plate between two series capacitors. Having both capacitor plates overlaying the same ceramic substrate surface permits simplified manufacturing techniques and reduces the possibility of shorting at high voltage through potential failure paths inherent in prior art high voltage monolithic ceramic capacitors.

DESCRIPTION OF THE PREFERRED EMBODIMENT

Figure 1:
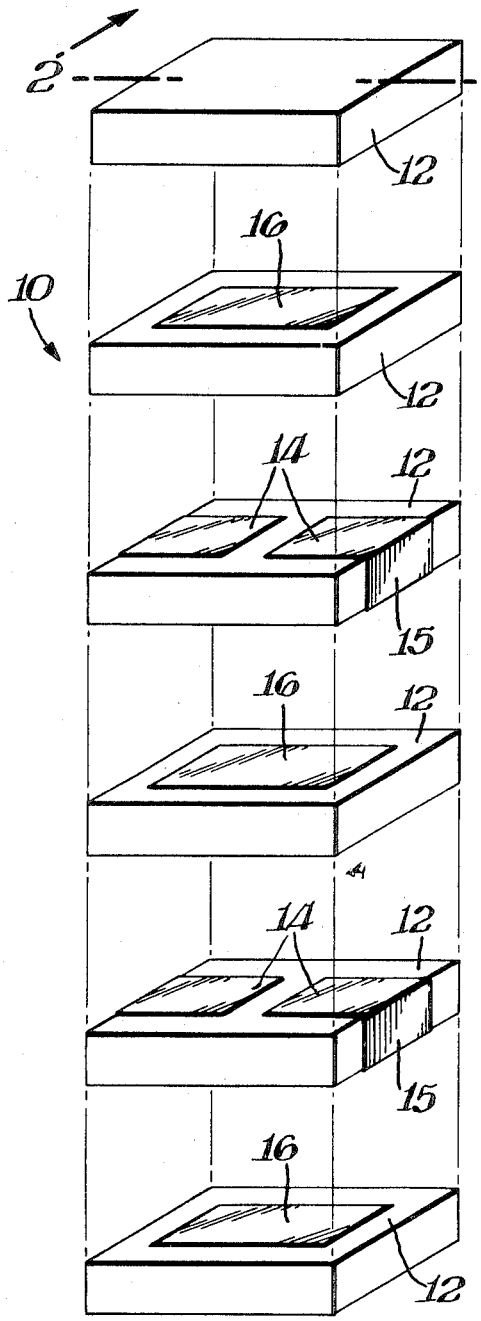
FIG. 1 is an exploded view of a capacitor formed in accordance with this invention.

FIG. 1 is an exploded view of a high voltage monolithic ceramic capacitor 10 constructed in accordance with this invention. Capacitor 10 includes ceramic dielectric layers 12 with metallized coatings 14 which form the capacitor plates and which extend over edges 15 on both ends of capacitor stack 10. Metallized coatings 16 are floating electrodes which are not in electrical contact with either terminal of capacitor stack 10. Floating electrodes 16 are the same width as capacitor plates 14 and function as common intermediate capacitor plates between two series capacitors whose outside capacitor plates are formed by metallized coatings 14.

Figure 2:
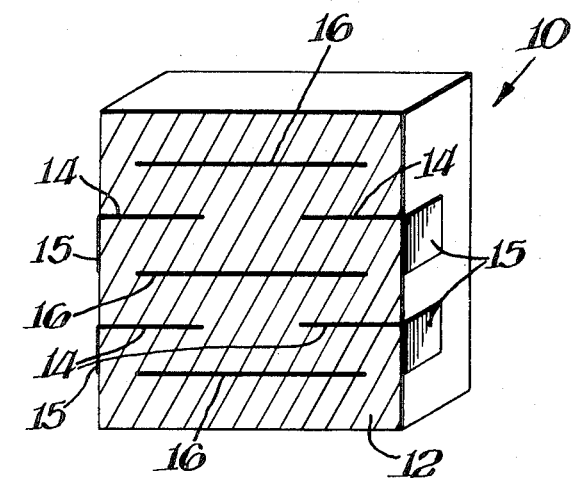
FIG. 2 is a cross section view of FIG. 1 in its assembled form taken along line 2—2.

The procedure involved in forming the finished capacitor includes stacking unfired barium titanate layers to form ceramic layers 12. Metallized coatings 14 and 16 may be deposited by either screening or etching processes. The metallized coatings are made of platinum, although they could be made of other high conductivity metals, such as Pd or Rh. The ceramic layers are next sintered together at a temperature in the range of 2,400°F to 2,700°F which results in a parallel plate monolithic capacitor 10 in which the layers 12 are bonded together and free of porosity as shown in the cross-section view of FIG. 2. The sintering temperature is dependent upon the ceramic material employed and encompasses all of the well-known firing ranges for the various commercially employed ceramic compositions. The manufacturing process of this invention has been simplified by having both capacitor plates 14 deposited on the same surface of ceramic layer 12, as opposed to being disposed on alternate ceramic layers as in prior art capacitors. In the example shown in FIG. 1 the individual ceramic layers 12 are about 0.012 inch thick and may be arranged in any number of layers to achieve the desired capacitance.

Figure 3:
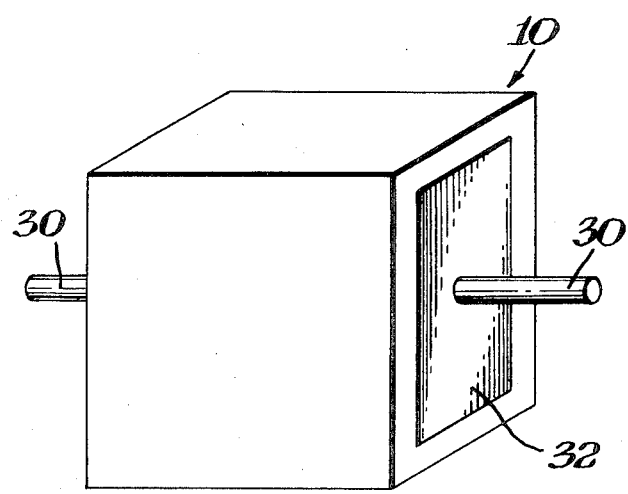
FIG. 3 is a perspective view of the capacitor of FIG. 2 in its assembled form.

FIG. 3 shows capacitor 10 after the capacitor stack has been sintered together. A metallic plate 32 is applied to make electrical contact with metal edges 15 at each end of capacitor stack 10. An external capacitor lead 30 is attached to each metal plate 32. In prior art high voltage monolithic ceramic capacitors having oppositely poled capacitor plates disposed on alternate ceramic layers, potential failure paths at high voltage arose between the edge of a capacitor plate and opposing metal plate 32 which was also embodied in prior art devices. Disposing both capacitor plates on the same surface coupled together by a common floating electrode disposed on the opposing surface of the dielectric layer lowers the possibility of such a failure by reducing the voltage across any potential failure path between the edge of floating electrode 16 and metal plate 32 to one half the potential across the entire capacitor.

Floating electrodes 16 are the outermost electrodes at the top and the bottom of capacitor stack 10. A definite advantage occurs in the case when the outer ceramic insulating layers are in contact with a conductor such that a potential occurs across the ceramic layer. The potential will be less between the floating electrode and the metal on the surface than if the electrode was not floating and connected to the terminal of opposite polarity. Therefore the outer ceramic layer can be thinner for the floating electrode design.

Obviously many modifications and variations of the above invention are possible in light of the above teachings. It is therefore to be understood that within the scope of the appended claims the invention may be practiced otherwise than specifically described.

What is claimed is:

1. A high voltage monolithic ceramic capacitor comprising a monolithic stack of a plurality of sintered-together ceramic layers of equal length and width; a first conductive coating on a planar surface of a layer of said stack, said first coating egressing at opposite ends of said stack and divided by a ceramic margin as to form two separate conductive surfaces; a second conducting coating of substantially the same width as said first coating on another planar surface of a layer of said stack with a ceramic margin extending perimetrically around said second coating to form a floating electrode bridging said margin of said first coating; said second coating being disposed to said first coating as to form a ceramic surface between conducting surfaces; a plurality of said first and second coatings alternately disposed in said stack; and the top and bottom of said stack being layers of insulative ceramic, said floating electrodes forming an interface with the inside surface of said top and bottom layers.

2. The capacitor of claim 1 wherein conductive plates provide electrical contact with said first conductive coatings which egress from said opposite ends of said capacitor, said plates being fixed in planes substantially perpendicular to the plane of said conductive coatings; and conductive leads making electrical contact with said plates.

* * * * *